United States Patent
Hwang et al.

(10) Patent No.: US 9,344,708 B2
(45) Date of Patent: May 17, 2016

(54) NON-GLASSES TYPE STEREOSCOPIC IMAGE DISPLAY DEVICE

(71) Applicant: LG Display Co., Ltd., Seoul (KR)

(72) Inventors: Kwangjo Hwang, Paju-si (KR); Euitae Kim, Paju-si (JP); Hoonki Kim, Paju-si (KR); Youyong Jin, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 239 days.

(21) Appl. No.: 14/102,163

(22) Filed: Dec. 10, 2013

(65) Prior Publication Data

US 2014/0285642 A1    Sep. 25, 2014

(30) Foreign Application Priority Data

Mar. 20, 2013    (KR) .................. 10-2013-0029565

(51) Int. Cl.
*H04N 13/04* (2006.01)
*H04N 9/47* (2006.01)
*G02B 27/22* (2006.01)
*G02F 1/1343* (2006.01)

(52) U.S. Cl.
CPC ........ *H04N 13/0415* (2013.01); *G02B 27/2214* (2013.01); *H04N 13/0404* (2013.01); *G02F 1/134309* (2013.01)

(58) Field of Classification Search
None
See application file for complete search history.

(56) References Cited

U.S. PATENT DOCUMENTS

2005/0259323 A1* 11/2005 Fukushima ........ G02B 27/2214
                                                        359/462
2007/0121076 A1* 5/2007 Klippstein ........... G02B 27/225
                                                        353/30
2011/0216177 A1* 9/2011 Chae ..................... H04N 13/04
                                                        348/57
2011/0310090 A1* 12/2011 Kim ................... G02B 27/2264
                                                        345/419
2012/0033053 A1* 2/2012 Park ................... H04N 13/0497
                                                        348/51
2012/0162761 A1   6/2012 Grasnick et al.
2012/0268481 A1* 10/2012 Niioka ............... H04N 13/0415
                                                        345/619
2013/0194521 A1* 8/2013 Whangbo .......... G02B 27/2214
                                                        349/15

FOREIGN PATENT DOCUMENTS

| EP | 0833184 A1 | 4/1998 |
|---|---|---|
| EP | 1455540 A2 | 9/2004 |
| EP | 1566683 A1 | 8/2005 |
| KR | 10-2013-0013959 A | 2/2013 |
| TW | 201305606 A | 2/2013 |

OTHER PUBLICATIONS

Taiwan Office Action, Taiwan Application No. 102145705, May 13, 2015, 9 pages.

* cited by examiner

*Primary Examiner* — Frederick Bailey
*Assistant Examiner* — Talha M Nawaz
(74) *Attorney, Agent, or Firm* — Fenwick & West LLP

(57) ABSTRACT

A non-glasses type stereoscopic image display device comprises: a display panel that comprises a plurality of sub-pixels and displays multi-view images in predetermined units; and an optical plate array that is formed side by side with the sub-pixels and divides the multi-view images into a plurality of multi-view areas, each of the sub-pixels comprising a first color sub-pixel, a second color sub-pixel, and a third color sub-pixel, which alternate in the same row along a horizontal direction in which gate lines extend and are formed side by side along a vertical direction in which data lines extend in different columns, wherein vertically neighboring sub-pixels displaying different colors partially overlap each other in the vertical direction.

12 Claims, 12 Drawing Sheets

NON-GLASSES TYPE STEREOSCOPIC IMAGE DISPLAY DEVICE

CROSS-REFERENCE TO RELATED APPLICATIONS

This application claims the benefit of Korean Patent Application No. 10-2013-0029565 filed on Mar. 20, 2013, which is incorporated herein by reference for all purposes as if fully set forth herein.

BACKGROUND

1. Field

This document relates to a non-glasses type stereoscopic image display device which displays a stereoscopic image by switching multi-view images to their respective multi-view areas by an optical plate.

2. Related Art

A stereoscopic image display device may be classified into a stereoscopic technique and an autostereoscopic technique. The stereoscopic technique is implemented using parallax images of left and right eyes having the most reliable three dimensional effects. The stereoscopic technique is classified into a glasses method and a non-glasses method, both of which are commercialized.

Because of the convenience of allowing users to view stereoscopic images without wearing shutter glasses or polarized glasses, the non-glasses method has been frequently used for small-to-medium sized displays such as smartphones, tablets, or laptops in recent years. The non-glasses method is a method which obtains a stereoscopic image by separating the optical axes of left and right parallax images using an optical plate such as a parallax barrier or a lenticular lens.

In the non-glasses method, a display defect and Moiré pattern may be perceived due to interference between the optical plate 2 of FIG. 1 and a black matrix BM formed on a display panel 1. To avoid the display defect and Moiré pattern, the non-glasses method employs slanted lenses (or slanted barriers) 2 slanting at a predetermined angle from sub-pixels of the display panel 1 to divide multi-view images V1 and V2 into respective view areas, as shown in FIG. 1. As seen from FIG. 1, the use of the slanted lenses 2 can reduce the overlapping regions between the boundary regions BP of the lenses 2 and the black matrix BM, and can therefore reduce the display defect, etc.

However, the conventional non-glasses method using slanted lenses or the like has the problem of dark lines (black stripes) and three-dimensional (3D) crosstalk caused by luminance difference depending on the viewing angle, as shown in FIG. 2. In FIG. 2, the dotted line graph indicates the luminance intensity of a first view image V1 versus viewing angle, and the solid line graph indicates the luminance intensity of a full-white image. Here, the first view image V1 indicates either a left-eye image or right-eye image, and the second-view image V2 indicates the other eye's image.

The angle of refraction of display light entering the slanted lenses 2 from the display panel 1 is relatively large at the edges EG of the slanted lenses 2, compared to that at the centers CEN of the slanted lenses 2. 3D crosstalk occurs when multi-view images are seen as interfering with each other in the user's single eye. To reduce 3D crosstalk, the first view image V1 should be refracted from one side edge of the slanted lenses 2 toward the left eye (or right eye) of the user, and the second view image V2 should be refracted from the other side edge of the slanted lenses 2 toward the right eye (or left eye) of the user, in order to prevent interference between the first view image V1 and the second view image V2 seen in a single eye.

However, the use of the slanted lenses 2 of FIG. 1 causes the sub-pixels for displaying the first view image V1 (or second view image V2) to overlap the left half portion LT and right half portion RT of each of the lenses 2 in a specific area AA of the display panel 1, always making the sub-pixels correspond to the centers CEN of the lenses 2. In this case, a specific view image (V1 of FIG. 1) passing through the centers CEN Of the lenses 2 enters both the left and right eyes of the user, thus causing 3D crosstalk.

SUMMARY

The present invention has been made in an effort to provide a non-glasses type stereoscopic image display device which can reduce display defect, luminance difference, and 3D crosstalk by forming optical plates side by side with sub-pixels of a display panel so as to be prevented from being inclined with respect to the sub-pixels, and changing the shape and arrangement of the sub-pixels.

The non-glasses type stereoscopic image display device according to the present invention comprises: a display panel that comprises a plurality of sub-pixels and displays multi-view images in predetermined units; and an optical plate array that is formed side by side with the sub-pixels and divides the multi-view images into a plurality of multi-view areas, each of the sub-pixels comprising a first color sub-pixel, a second color sub-pixel, and a third color sub-pixel, which alternate in the same row along a horizontal direction in which gate lines extend and are formed side by side along a vertical direction in which data lines extend in different columns, wherein vertically neighboring sub-pixels displaying different colors partially overlap each other in the vertical direction.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
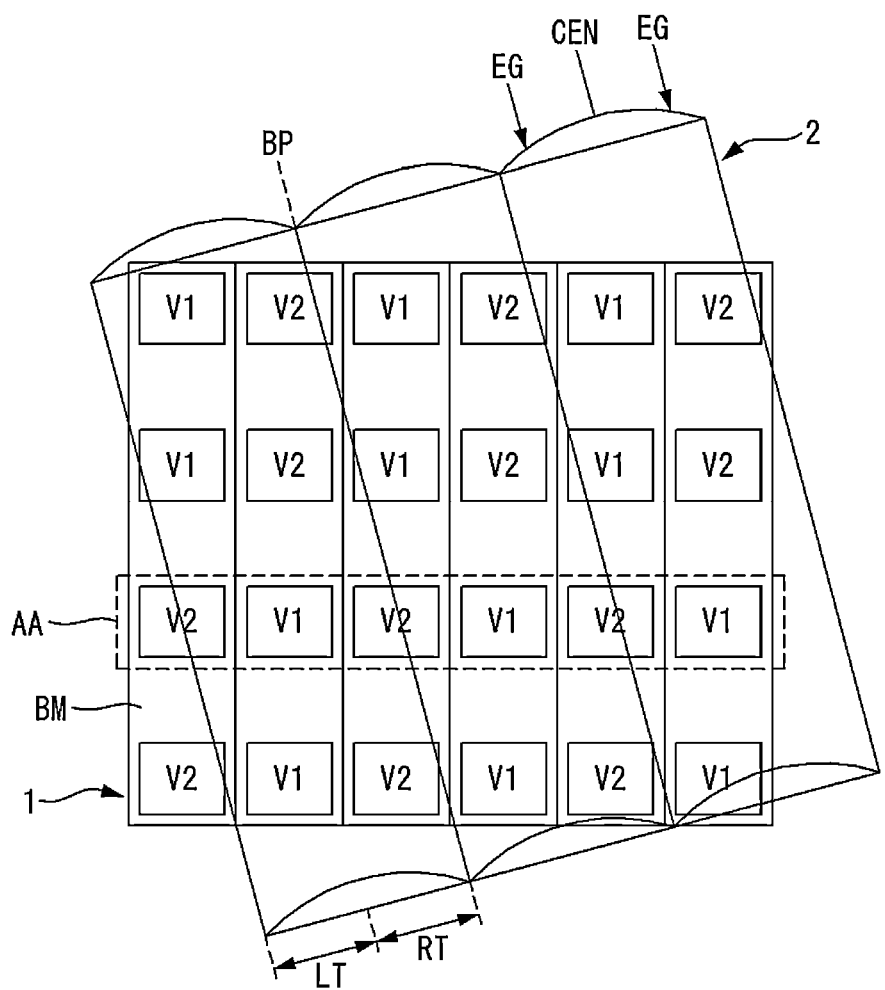
FIG. 1 is a view schematically showing a conventional non-glasses type stereoscopic image display device using slanted lenses.
Figure 2:
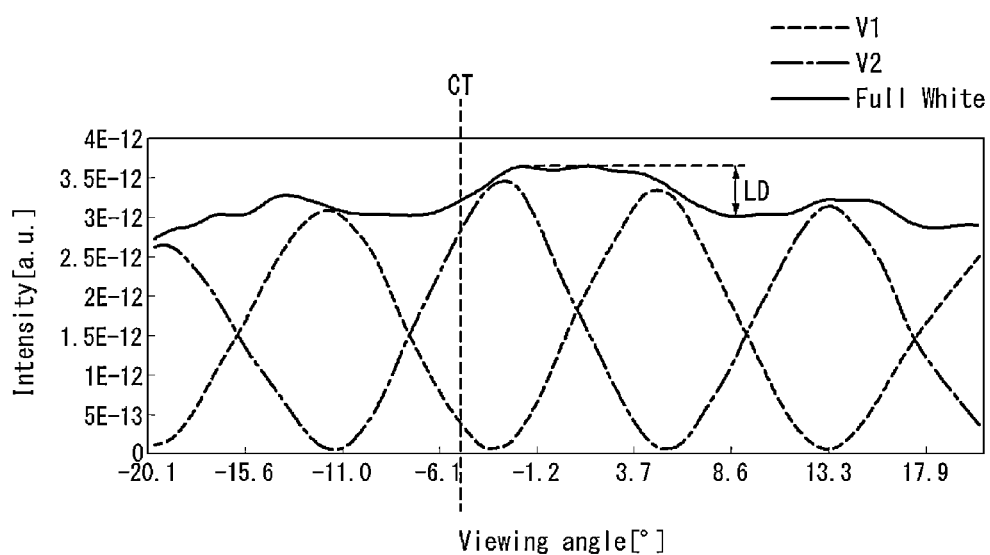
FIG. 2 is a view showing luminance differences and 3D crosstalk which occur in a conventional non-glasses method using slanted lenses.

Hereinafter, exemplary embodiments of the present invention will be described in detail with reference to the attached drawings. Throughout the specification, the same reference numerals indicate substantially the same components. Further, in the following description, well-known functions or constructions related to the present invention will not be described in detail if it appears that they could obscure the invention in unnecessary detail. Names of elements used in the following description are selected in consideration of facility of specification preparation. Thus, the names of the elements may be different from names of elements used in a real product.

Figure 3:
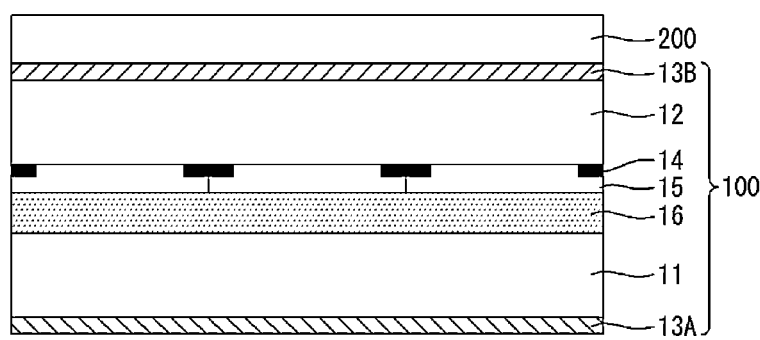
FIG. 3 is a cross-sectional view of a non-glasses type stereoscopic image display device according to an exemplary embodiment of the present invention.

FIG. 3 is a cross-sectional view of a non-glasses type stereoscopic image display device according to an exemplary embodiment of the present invention.

Referring to FIG. 3, the non-glasses type stereoscopic image display device according to the exemplary embodiment of the present invention comprises a display panel 100 and an optical plate array 200. The display panel 100 displays multi-view images comprising first to n-th view images in n (n is a positive integer) sub-pixels. The display panel 100 may be implemented as a flat panel display device such as a liquid crystal display (LCD), a field emission display (FED), a plasma display panel (PDP), and an organic light emitting diode (OLED). In the following, it is to be noted that the display panel 100 is illustrated as being implemented as a liquid crystal display device, but the present invention is not limited thereto.

The display panel 100 comprises a lower substrate 11 and an upper substrate 12 which face each other, with a liquid crystal layer 15 interposed between them. A pixel array comprising a plurality of sub-pixels arranged in a matrix form according to an intersecting structure of data lines (D1 to D7 of FIG. 4) and gate lines (or scan lines; G1 to G5 of FIG. 4) is formed on the lower substrate 11 of the display panel 100. When the display panel 100 is implemented as a liquid crystal display device, the sub-pixels of the pixel array drive liquid crystals of the liquid crystal layer by a voltage difference between pixel electrodes charged with a data voltage through TFTs (thin film transistors) and a common electrode to which a common voltage is applied, and adjust the amount of light transmission, thereby displaying an image. A black matrix 14 and color filters 15 are formed on the upper substrate of the display panel 100. The color filters 15 comprise a R (red) color filter for forming a first color sub-pixel, a G (green) color filter for forming a second color sub-pixel, and a B (blue) color filter for forming a third color sub-pixel. A lower polarizer 13A is attached to the lower substrate 11 of the display panel 100, and an upper polarizer 13B is attached to the upper substrate 12 of the display panel 100. The light transmission axis of the lower polarizer 13A and the light transmission axis of the upper polarizer 13B meet at right angles.

The sub-pixels of the display panel 100 display a 2D image in the 2D mode and multi-view images in the 3D mode. The multi-view images comprise n view images, and the n view images are produced by sequentially separating n cameras by the distance between the user's eyes and capturing images of an object. The display panel 100 displays multi-view images in n sub-pixels in the 3D mode. For example, as set forth below with respect to the exemplary embodiment, the display panel 100 is able to display multi-view images in two sub-pixels in the 3D mode. While the exemplary embodiment below will be described with respect to an example where the n view images are implemented as two view images (V1 and V2 of FIG. 6, etc) for the sake of convenience of explanation, it should be noted that the technical spirit of the present invention is not limited to this example. The multi-view images comprise a left-eye image that enters the user's left eye and a right-eye image that enters the user's right eye. When the multi-view images are implemented as a first view image and a second view image, the first view image is either the left-eye image or the right-eye image, and the second view image is the other eye's image.

The optical plate array 200 divides first to n-th view images displayed in n sub-pixels into first to n-th view images, respectively. The optical plate array 200 may be implemented as any type of lenticular lens array or parallax barrier array capable of light separation. The exemplary embodiment to be discussed below will be explained by taking a lenticular lens array as an example. The lenticular lens array comprises both an active liquid crystal lens array and a passive birefringent lens array.

The active liquid crystal lens array comprises a polarization control cell and anisotropic liquid crystal lenses. The polarization control cell varies the polarization direction of an image (light) incident from the display panel 100 depending on if the display panel is in a two-dimensional (2D) or 3D mode. The polarization control cell selectively changes the polarization direction from a first polarization direction to a second polarization direction or from the second polarization direction to the first polarization direction depending on the driving mode. The first polarization direction and the second polarization direction are orthogonal to each other. The anisotropic liquid crystal lenses have an anisotropic refractive index which varies depending on the polarization direction of an incident image. The anisotropic liquid crystal lenses are implemented to serve as lenses only when an image is incident in the first polarization direction (3D mode). Meanwhile, the passive birefringent lens array is implemented as film type birefringent lenses formed on a base member.

Figure 4:
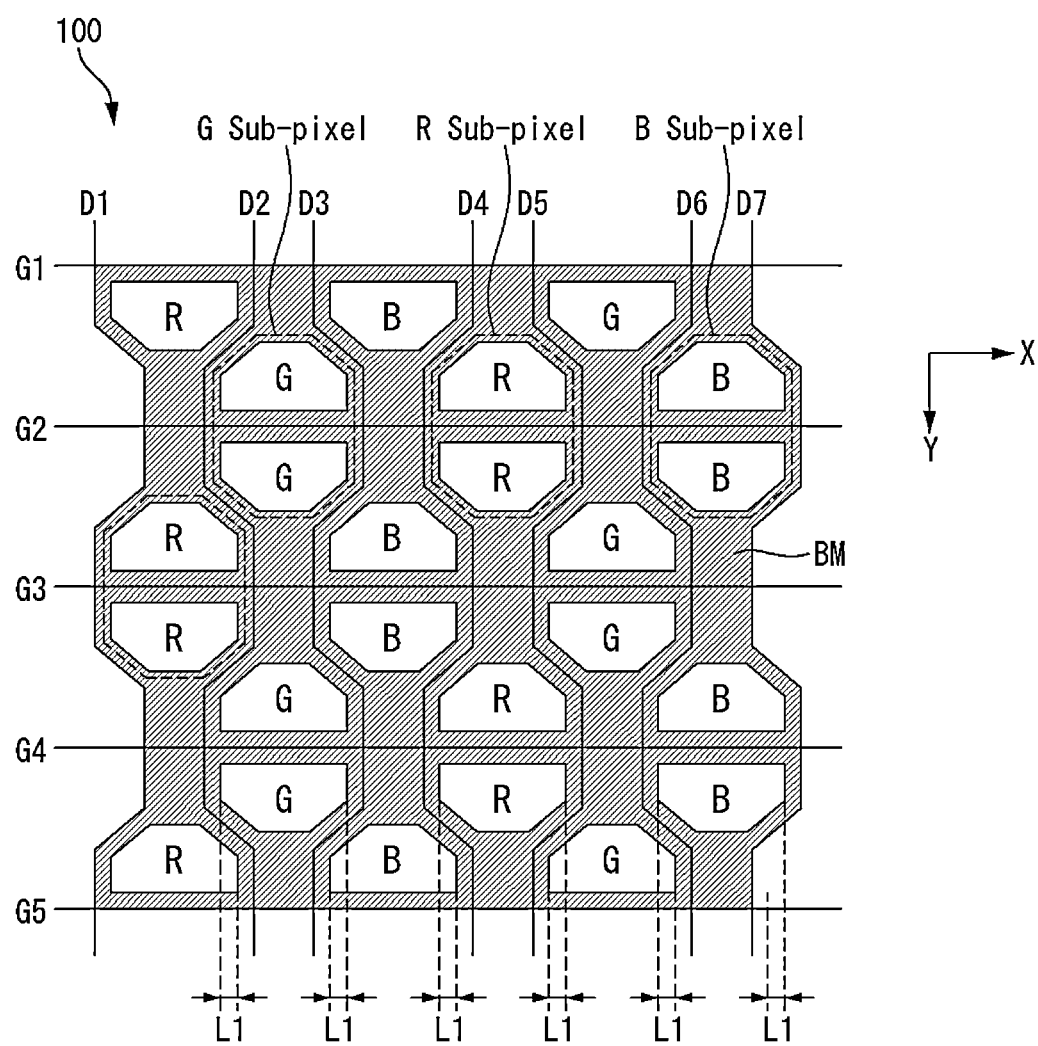
FIG. 4 shows the shape and arrangement of sub-pixels according to the present invention, which are intended to reduce a display defect, luminance difference, and 3D crosstalk.

To reduce display defects, luminance difference, and 3D crosstalk, in the present invention, the optical plate array 200 does not slant at a predetermined angle from the sub-pixels like in the conventional art (slanted type), but is formed side by side with the sub-pixels (vertical type), and the shape and arrangement of the sub-pixels of the display panel are changed as shown in FIG. 4, etc. Each of the sub-pixels of the display panel 100 comprises a first color sub-pixel, a second color sub-pixel, and a third color sub-pixel, which alternate in the same row along a horizontal direction and are arranged side by side in different columns along a vertical direction.

Vertically adjacent sub-pixels displaying different colors partially overlap each other in the vertical direction.

The optical plate array 200 of the present invention comprises a plurality of unit optical plates (LP1 to LP3 of FIG. 7) through which multi-view images are transmitted, and the boundary regions between the unit optical plates are aligned with the display panel 100 so as to face the vertically overlapping regions (L1 of FIG. 4) of the sub-pixels.

Figure 5:
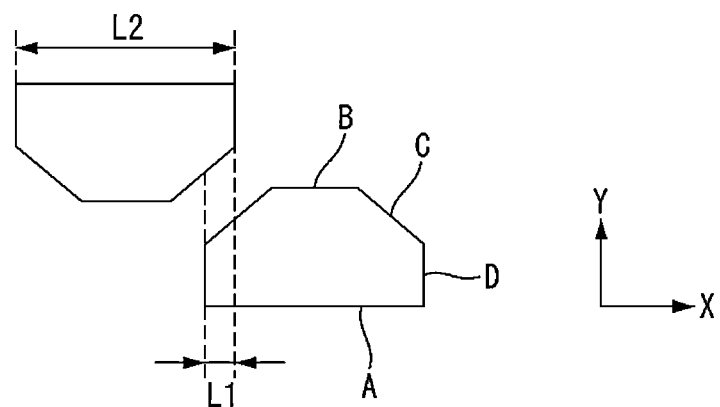
FIG. 5 shows that vertically adjacent sub-pixels displaying different colors partially overlap each other in the vertical direction according to one embodiment.
Figure 6:
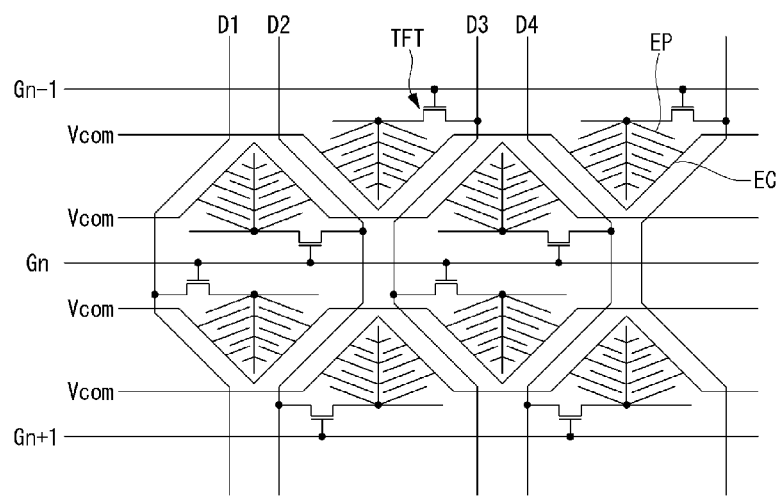
FIG. 6 shows a concrete connection structure of sub-pixels according to one embodiment.

FIG. 4 shows the shape and arrangement of sub-pixels according to the present invention, which are intended to reduce display defects, luminance difference, and 3D crosstalk. FIG. 5 shows that vertically adjacent sub-pixels displaying different colors partially overlap each other in the vertical direction. FIG. 6 shows a concrete connection structure of sub-pixels.

Referring to FIG. 4, each of the sub-pixels comprises a first color sub-pixel having a R (red) color filter, a second color sub-pixel having a G (green) color filter, and a third color sub-pixel having a B (blue) color filter.

The first to third sub-pixels alternate in the same row (RL#1, RL#2, RL#3, etc. of FIG. 13) along the horizontal direction X in which the gate lines G1 to G5 extend, and are arranged side by side in different columns (CL#1, CL#2, CL#3, etc. of FIG. 13) along the vertical direction Y in which the data lines D1 to D7 extend.

Figures 13, 14:
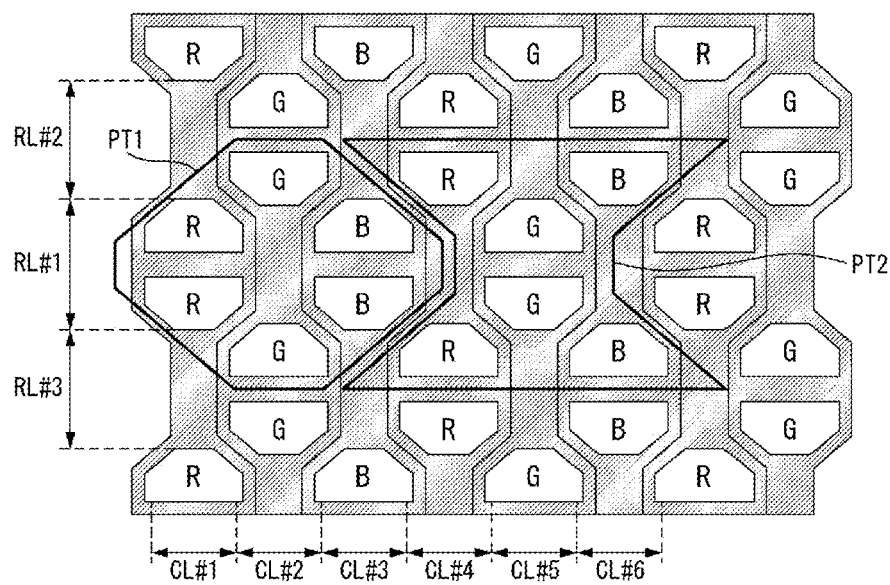
FIG. 13 shows a pixel rendering structure for higher resolution according to one embodiment.
FIG. 14 shows the comparison between a conventional stripe pixel rendering structure and the pixel rendering structure of the present invention, with respect to a plurality of display patterns.

The first to third sub-pixels are formed side by side in the vertical direction Y, like in the conventional normal stripe structure (see FIG. 14). That is, the first column, along which the first color sub-pixels are vertically arranged, the second column, along which the second color sub-pixels are vertically arranged, and the third column, along which the third color sub-pixels are vertically arranged, are formed on the display panel 100, and the first to third columns are formed in repeating fashion.

With this configuration, vertically adjacent sub-pixels displaying different colors partially overlap each other in the vertical direction. Specifically, each of the sub-pixels have the same maximum horizontal width L2, and the horizontal width L1 of a vertically overlapping region of the vertically adjacent sub-pixels displaying different colors is defined within the range of 10% or less of the maximum horizontal width L2. By increasing the horizontal width L1 to an appropriate level within the range of 10% or less of the maximum horizontal width L2, the proportion of the black matrix BM in the vertically overlapping region can be reduced. As a result, in the present invention, increasing luminance can remove dark lines (black stripes), as in the conventional art, and reduce the extent of display defects caused by luminance difference. However, if the horizontal width L1 is increased by over 10%, bright lines caused by the increase in luminance may appear in the overlapping region, and further lead to more 3D crosstalk, which is to be described later. Therefore, it is to be noted that this should be taken into consideration in terms of design.

The first to third sub-pixels each are divided into two parts, with a gate line interposed between the two parts, in order to increase the vertical resolution in the 2D or 3D mode by two times. As each sub-pixel is divided into two parts, it comprises an upper display part and a lower display part. The upper and lower display parts constituting one sub-pixel share a gate line existing between them (i.e., the upper and lower display parts are commonly connected to the gate line), and are individually connected to different data lines, thereby displaying the same data (or the same view image). Also, the upper display part of any one of the first to third colors shares a data line with the lower display part of one of the other two colors.

Specifically, as shown in FIG. 4, a first color (R) sub-pixel divided into two parts facing each other with an n-th (n is a positive integer, e.g., 3) gate line G3 existing between them comprises a first color upper display part and a first color lower display part. As can be seen in FIG. 6, the pixel electrode EP of the first color upper display part is connected to the second data line D2 through a TFT, and the pixel electrode EP of the first color lower display part is connected to the first data line D1 through a TFT. A common voltage Vcom is supplied to common electrodes EC facing the pixel electrodes EP. The pixel electrode EP of the first color upper display part and the pixel electrode EP of the first color lower display part are simultaneously charged and discharged by a switching operation of the TFTs connected to the gate line G3.

As shown in FIG. 4, the second color (G) sub-pixel divided into two parts facing an (n−1)-th gate line G2 existing between them comprises a second color upper display part and a second color lower display part. As can be seen through FIG. 6, the pixel electrode EP of the second color upper display part is connected to the second data line D2 through a TFT, and the pixel electrode EP of the second color lower display part is connected to the third data line D3 through a TFT. The pixel electrode EP of the second color upper display part and the pixel electrode EP of the second color lower display part are simultaneously charged and discharged by a switching operation of the TFTs connected to the gate line G2.

As shown in FIG. 4, the third color (B) sub-pixel divided into two parts facing an (n+1)-th gate line G4 existing between them comprises a third color upper display part and a third color lower display part. As can be seen through FIG. 6, the pixel electrode EP of the third color upper display part is connected to the fourth data line D4 through a TFT, and the pixel electrode EP of the third color lower display part is connected to the third data line D3 through a TFT. The pixel electrode EP of the third color upper display part and the pixel electrode EP of the third color lower display part are simultaneously charged and discharged by a switching operation of the TFTs connected to the gate line G4.

As can be seen from above, the first color upper display part shares a data line with the second color lower display part vertically adjacent to it and arranged in the right upper side, the second color upper display part shares a data line with the third color lower display part vertically adjacent to it and arranged in the right upper side, and the third color upper display part shares a data line with the first color lower display part vertically adjacent to it and arranged in the right upper side.

As discussed above, given several circumstances, the horizontal width L1 of a vertically overlapping region is preferably defined within the range of 10% or less of the maximum horizontal width L2. To make it easy to adjust the horizontal width L1, it is preferable that the first to third color upper display parts constituting the first to third color sub-pixels are designed to be symmetrical in the horizontal direction and asymmetrical in the vertical direction, and the first to third color lower display parts constituting the first to third sub-pixels are designed to be symmetrical in the horizontal direction and asymmetrical in the vertical direction.

To this end, as shown in FIG. 5, each of the upper and lower display parts of the first to third colors may be shaped in a hexagon including a first horizontal side A having the maximum horizontal width L2, a second horizontal side B having a smaller horizontal width than the maximum horizontal width L2, a pair of vertical sides D vertically extending from both opposite ends of the first horizontal side A, and a pair of sloping sides C connecting both opposite ends of the second horizontal side B and the pair of vertical sides D. In the present invention, it is possible to increase the horizontal width L1 of an overlapping region while keeping the aperture ratio constant more easily, by increasing the length of the first horizontal side A and decreasing the length of the second horizontal side B and accordingly changing the length of the pair of sloping sides C and the length of the pair of vertical sides B. Needless to say, the length of each side can be adjusted in the reverse process to the above process in order to reduce the horizontal width L1 of an overlapping region while keeping the aperture ratio constant.

When the accuracy of a mask for forming sub-pixels cannot be increased, each of the upper and lower display parts of the first to third colors offers advantages similar to those mentioned above even if they are designed to have a semicircular shape.

Figure 7:
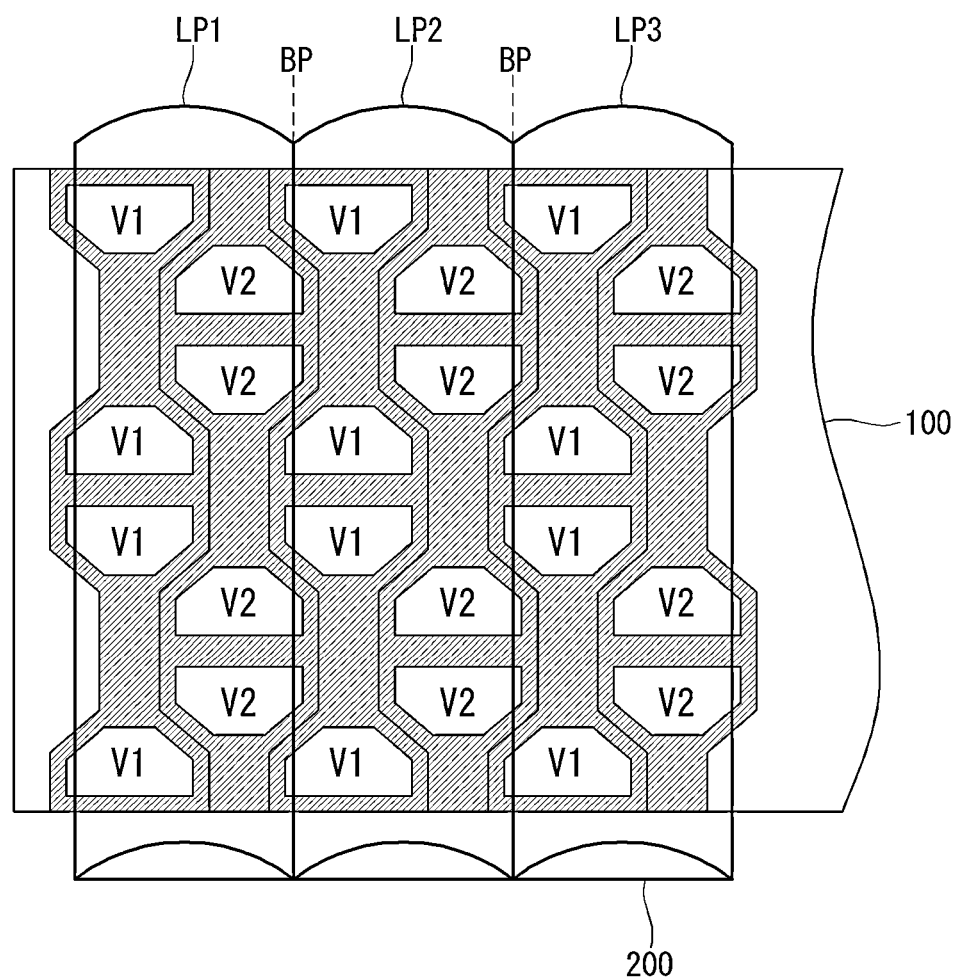
FIG. 7 shows the aligned state of an optical plate array of a display panel according to one embodiment.
Figure 8:
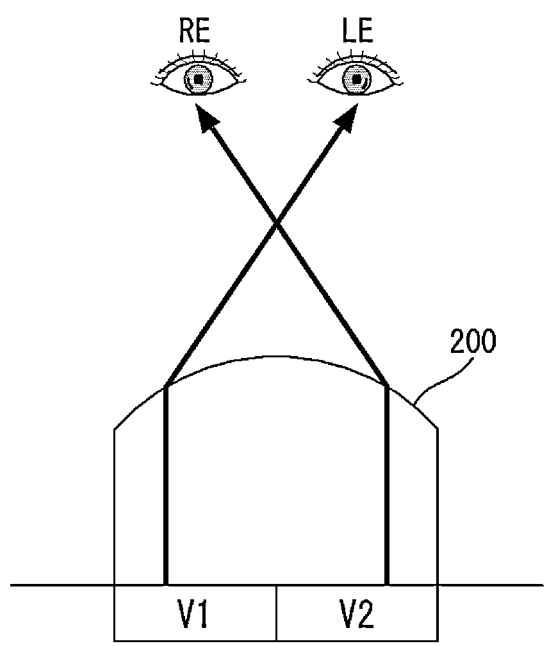
FIG. 8 shows view images which are refracted through the optical plate array.

FIG. 7 shows the aligned state of the optical plate array 200 of the display panel 100. FIG. 8 shows view images which are refracted through the optical plate array 200.

Referring to FIG. 7, when multi-view images are implemented as a first view image V1 and a second view image V2, the optical plate array 200 comprises unit optical plates LP1, LP2, and LP3 through which the first view image V1 and the second view image V2 are transmitted.

Each of the unit optical plates LP1, LP2, and LP3 refracts the first view image V1 and second view image V2 incident from the display panel 100 and separates them into a first view area (e.g., the user's left eye LE of FIG. 8) and a second view area (e.g., the user's right eye RE of FIG. 8). In the present invention, in order to remove dark lines (black stripes) and reduce the extent of display defects caused by luminance difference by increasing luminance, the optical plate array 200 is aligned with the display panel 100 so that boundary regions BP formed between the unit optical plats LP1, LP2, and LP3 face the overlapping regions L1.

As such, the first view image V1 is displayed in the sub-pixels of the same color facing the left half portion of each of the unit optical plates LP1, LP2, and LP3 and arranged side by side in the vertical direction, and the second view image V2 is displayed in the sub-pixels of the same color facing the right half portion of each of the unit optical plates LP1, LP2, and LP3 and arranged side by side in the vertical direction.

As a result, as shown in FIG. 8, the first view image V1 incident from the display panel 100 is refracted from the left half-planes of the unit optical plates LP1, LP2, and LP3 toward the user's left eye LE, and the second view image V2 incident from the display panel 100 is refracted from the right half-planes of the unit optical plates LP1, LP2, and LP3 toward the user's right eye RE. According to the present invention, as the first view image V1 and the second view image V2 are smoothly separated through the unit optical plates LP1, LP2, and LP3, 3D crosstalk can be reduced much compared to when conventional slanted optical plats are used.

Figure 9:
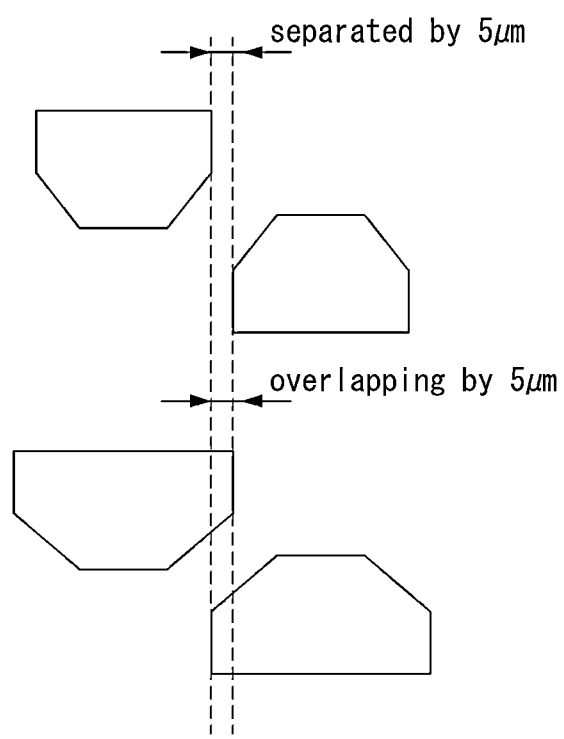
FIG. 9 shows vertically adjacent sub-pixels displaying different colors which overlap each other in a vertical direction by a predetermined width and are separated from each other by the predetermined width.
Figure 10A:
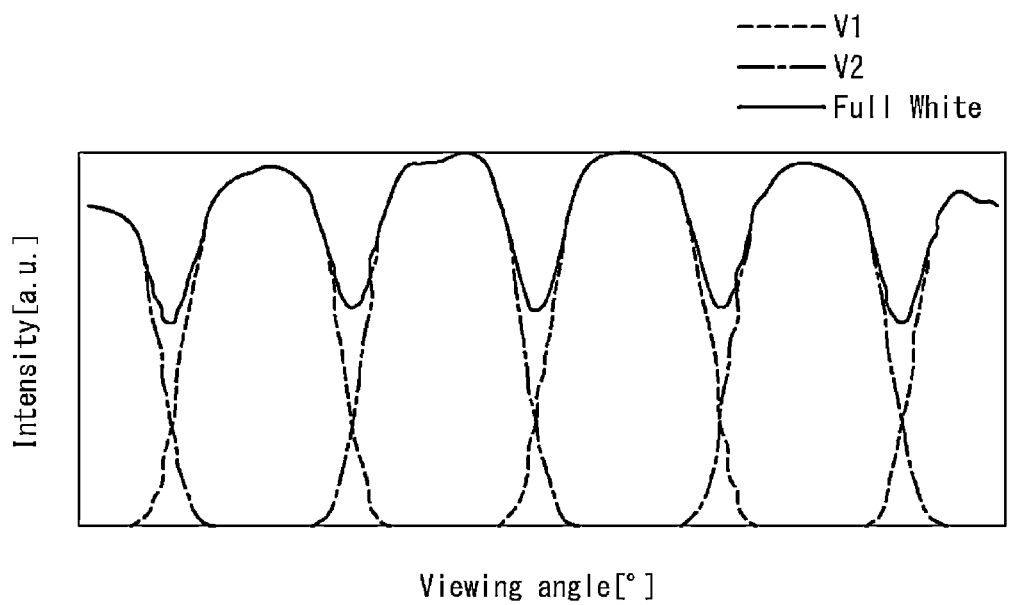
FIG. 10a illustrates the luminance difference caused when the sub-pixels of FIG. 9 are separated from each other by the predetermined width.
Figure 10B:
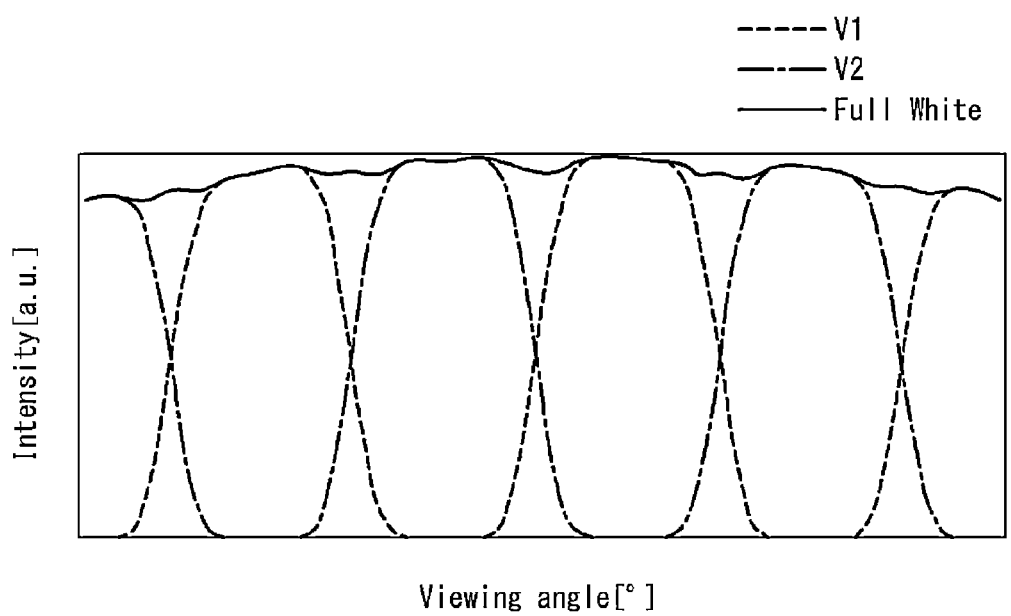
FIG. 10b illustrates the luminance difference caused when the sub-pixels of FIG. 9 overlap each other by the predetermined width.

FIG. 9 shows vertically adjacent sub-pixels displaying different colors which overlap each other in a vertical direction by a predetermined width and are separated from each other by the predetermined width. FIG. 10a illustrates the luminance difference caused when the sub-pixels of FIG. 9 are separated from each other by the predetermined width. FIG. 10b illustrates the luminance difference caused when the sub-pixels of FIG. 9 overlap each other by the predetermined width.

When the sub-pixels of FIG. 9 overlap each other by 5 μm, the maximum horizontal width (L2 of FIG. 5) selected for the sub-pixels is 107.4 μm. In FIGS. 10a and 10b, the dotted line graph indicates the luminance intensity of the first view image V1 versus viewing angle, the dashed-dotted line graph indicates the luminance intensity of the second view image V2 versus viewing angle, and the solid line graph indicates the luminance intensity of a full-white image.

When the vertically adjacent sub-pixels of FIG. 9 displaying different colors are vertically separated by 5 μm, the luminance intensity of the full-white image versus viewing angle is much lower at the boundary regions of the unit optical plates, compared to those in the other regions, as shown in FIG. 10a, and this increases the luminance difference versus viewing angle. This luminance difference looks like a dark line (black stripe). On the contrary, when the vertically adjacent sub-pixels of FIG. 9 displaying different colors overlap each other by 5 μm, the luminance intensity of the full-white image versus viewing angle is almost uniform in all the regions, and this significantly decreases the luminance difference versus viewing angle.

Figure 11:
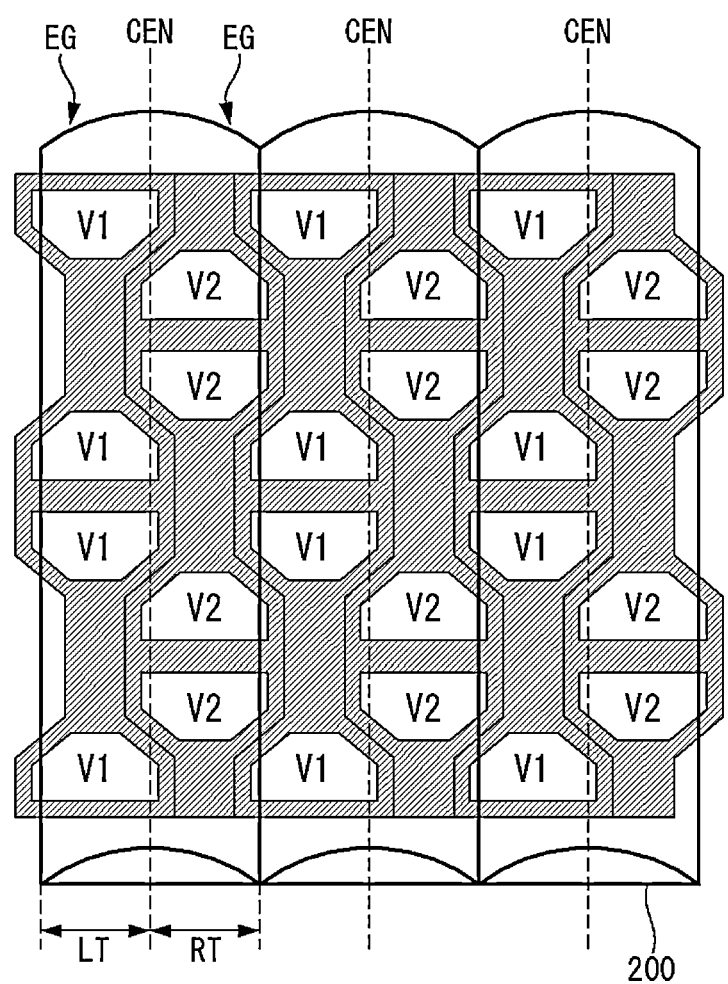
FIGS. 11 and 12 are views for explaining 3D crosstalk, which occurs when the horizontal width L1 of the overlapping region of FIG. 5 is increased too much.
Figure 12:
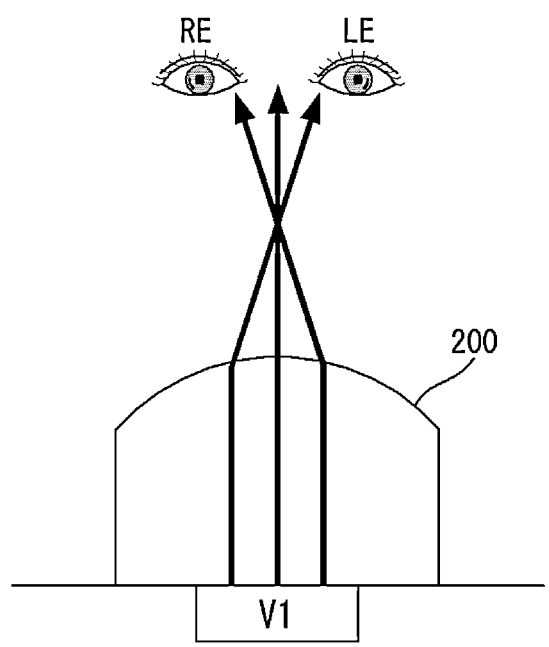

FIGS. 11 and 12 are views for explaining 3D crosstalk, which occurs when the horizontal width L1 of the overlapping region of FIG. 5 is increased too much.

Referring to FIG. 11, the angle of refraction of display light entering the optical plate array 200 from the display panel 100 is large at the edges EG of the unit optical plates and small at the centers CEN of the unit optical plates. Therefore, when the display light passes through the edges EG of the unit optical plates, the angle of refraction becomes larger and this makes it easy to separate the light between multi-view images. On the other hand, when the display light passes through the centers CEN of the unit optical plates, the angle of refraction becomes smaller and this makes it difficult to separate the light, and the first view image V1, i.e., left-eye image, that has passed through the unit optical plates enters the user's right eye RE as well as the left eye LE, as shown in FIG. 12. 3D crosstalk is perceived when both the left-eye image and the right-eye image simultaneously enter the user's single eye (left eye or right eye). Hence, the user feels 3D crosstalk in the right eye. When the display light passes through the centers CEN of the unit optical plates, the user feels 3D crosstalk in the left eye, too, in a similar way to the right eye.

To reduce 3D crosstalk, the display panel 100 and the optical plate array 200 should be designed to allow display light to pass through the edges EG of the left and right half portions LT and RT of the unit optical plates. As described above, if the horizontal width of an overlapping region is set to 10% or less of the maximum horizontal width, the display light passes through the edges EG of the left and right half portions LT and RT of the unit optical plates. However, if the horizontal width of the overlapping region exceeds 10% and up to 50% of the maximum horizontal width, both the sub-pixels displaying the first view image V1 and the sub-pixels displaying the second view image V2 correspond to the centers CEN between the left and right half portions LT and RT of the unit optical plates, thus causing crosstalk as shown in FIG. 12.

FIG. 13 shows a pixel rendering structure for higher resolution. FIG. 14 shows the comparison between a conventional stripe pixel rendering structure and the pixel rendering structure of the present invention, with respect to a plurality of display patterns.

In the present invention, a first color sub-pixel, a second color sub-pixel, and a third color sub-pixel constitute a single unit pixel. The unit pixel of the present invention is driven in units of first and second patterns PT1 and PT2 of different shapes, as shown in FIG. 13, to achieve good display quality in a variety of display patterns shown in FIG. 14.

The first pattern PT1 comprises six display parts. The first pattern PT1 comprises three upper display parts and three lower display parts, and its outline surrounding the six display parts has the shape of a pot whose left and right sides are convex in the middle.

The second pattern PT2 comprises six display parts. The second pattern PT2 comprises three upper display parts and three lower display parts, and its outline surrounding the six display parts has the shape of an hourglass whose left and right sides are concave in the middle.

The first pattern PT1 and the second pattern PT2 are alternately arranged in the horizontal direction. Also, the first pattern PT1 and the second pattern PT2 are arranged in repeating fashion in the vertical direction.

The first pattern PT1 comprises first color upper and lower display parts constituting a first color (R) sub-pixel of the first row RL#1, a second color lower display part constituting a second color (G) sub-pixel of the second row RL#2, a second color upper display part constituting a second color (G) sub-pixel of the third row RL#3, and third color upper and lower display parts constituting a third color (B) sub-pixel of the first row RL#1. The second color lower display part of the second row RL#2 and the second color upper display part of the third row RL#3 are arranged in the same column CL#2.

The second pattern PT2 comprises a first color lower display part constituting a first color (R) sub-pixel of the second row RL#2, a first color upper display part constituting a first color (R) sub-pixel of the third row RL#3, second color upper and lower display parts constituting a second color (G) sub-pixel of the first row RL#1, a third color lower display part constituting a third color (B) sub-pixel of the second row RL#2, and a third color upper display part constituting a third color (B) sub-pixel of the third row RL#3. The first color lower display part of the second row RL#2 and the first color upper display part of the third row RL#3 are arranged in the same column CL#4, and the third color lower display part the second row RL#2 and the third color upper display part of the third row RL#3 are arranged in the same column CL#6.

The present invention can achieve the same level of display quality as in the conventional stripe pixel rendering structure with respect to a variety of display patterns by driving pixels in units of the first and second patterns PT1 and PT2 of different shapes. For example, with the pixel rendering structure of the present invention, the same level of display quality as in the conventional art can be achieved with respect to a 1-dot horizontal stripe display pattern, a 1-dot vertical stripe display pattern, a 1-dot mosaic display pattern, a 2-dot mosaic display pattern, and a 2-dot diagonal display pattern, as shown in FIG. 14.

As discussed above, the present invention can reduce display defect, luminance difference, and 3D crosstalk by forming optical plates side by side with sub-pixels of a display panel so as to be prevented from being inclined with respect to the sub-pixels, and changing the shape and arrangement of the sub-pixels.

Furthermore, the present invention can achieve good display quality in a variety of display patterns by driving pixels in units of first and second patterns of different shapes.

Although particular embodiments of the present invention have been illustrated and described, it will be apparent to those skilled in the art that various changes and modifications can be made without departing from the spirit of the present invention. Accordingly, the technical scope of the present invention is not limited to the detailed description of the present invention, but should be defined by the appended claims.

What is claimed is:

1. A non-glasses type stereoscopic image display device comprising:
    a display panel that comprises a plurality of sub-pixels and displays multi-view images in predetermined units; and
    an optical plate array that is formed side by side with the sub-pixels and divides the multi-view images into a plurality of multi-view areas,
    each of the sub-pixels comprising a first color sub-pixel, a second color sub-pixel, and a third color sub-pixel are all of distinct colors, which alternate in a same row along a horizontal direction in which gate lines extend and are formed side by side along a vertical direction in which data lines extend in different columns,
    wherein vertically neighboring sub-pixels displaying different colors partially overlap each other in the vertical direction,
    wherein each of the first color sub-pixel, the second color sub-pixel, and the third color sub-pixel is divided into a first upper display part and a second lower display part that face each other and a gate line is interposed between the first upper display part and the second lower display part of each of the first color sub-pixel, the second color sub-pixel, and the third color sub-pixel.

2. The non-glasses type stereoscopic image display device of claim 1, wherein the sub-pixels have the same maximum horizontal width, and the horizontal width of a vertically overlapping region of the vertically adjacent sub-pixels displaying different colors is defined within the range of 10% or less of the maximum horizontal width.

3. The non-glasses type stereoscopic image display device of claim 2,
    wherein the upper display part of any one of the first to third colors shares a data line with the lower display part of one of the other two colors which is vertically adjacent thereto.

4. The non-glasses type stereoscopic image display device of claim 3, wherein the first to third color upper display parts are symmetrical in the horizontal direction and asymmetrical in the vertical direction, and the first to third color lower display parts are symmetrical in the horizontal direction and asymmetrical in the vertical direction.

5. The non-glasses type stereoscopic image display device of claim 3, wherein each of the upper and lower display parts of the first to third colors comprises:
    a first horizontal side having the maximum horizontal width;
    a second horizontal side having a smaller horizontal width than the maximum horizontal width;
    a pair of vertical sides vertically extending from both opposite ends of the first horizontal side; and
    a pair of sloping sides connecting both opposite ends of the second horizontal side and the pair of vertical sides.

6. The non-glasses stereoscopic image display device of claim 2, wherein the optical plate array comprises a plurality of unit optical plates through which the multi-view images are transmitted.

7. The non-glasses stereoscopic image display device of claim 6, wherein, when multi-view images are implemented as a first view image and a second view image, the first view image is displayed in the sub-pixels of the same color facing the left half portion of each of the unit optical plates and arranged side by side in the vertical direction, and the second view image is displayed in the sub-pixels of the same color facing the right half portion of each of the unit optical plates and arranged side by side in the vertical direction.

8. The non-glasses stereoscopic image display device of claim 3, wherein the first color sub-pixel, the second color sub-pixel, and the third color sub-pixel constitute a single unit pixel, and the unit pixel is driven in units of first and second patterns of different shapes.

9. The non-glasses stereoscopic image display device of claim 8, wherein the first pattern's outline surrounding three upper display parts and three lower display parts has the shape of a pot whose left and right sides are convex in the middle, and the second pattern's outline surrounding three upper display parts and three lower display parts has the shape of an hourglass whose left and right sides are concave in the middle.

10. The non-glasses stereoscopic image display device of claim 8, wherein the first pattern and the second pattern are alternately arranged in the horizontal direction, and the first pattern and the second pattern are arranged in repeating fashion in the vertical direction.

11. The non-glasses stereoscopic image display device of claim 9, wherein the first pattern comprises first color upper and lower display parts constituting a first color sub-pixel of the first row, a second color lower display part constituting a second color sub-pixel of the second row, a second color upper display part constituting a second color sub-pixel of the third row, and third color upper and lower display parts constituting a third color sub-pixel of the first row, and the second pattern comprises a first color lower display part constituting a first color sub-pixel of the second row, a first color upper display part constituting a first color sub-pixel of the third row, second color upper and lower display parts constituting a second color sub-pixel of the first row, a third color lower display part constituting a third color sub-pixel of the second row, and a third color upper display part constituting a third color sub-pixel of the third row.

12. The non-glasses stereoscopic image display device of claim 9, wherein the second color lower display part of the second row and the second color upper display part of the third row are arranged in a same column;

the first color lower display part of the second row and the first color upper display part of the third row are arranged in a same column, and the third color lower display part the second row and the third color upper display part of the third row are arranged in a same column.

* * * * *